United States Patent [19]

Tandon

[11] Patent Number: 5,416,611
[45] Date of Patent: May 16, 1995

[54] RASTER INPUT SCANNER WITH SHORT AND LONG INTEGRATION PERIODS

[75] Inventor: Jagdish C. Tandon, Fairport, N.Y.

[73] Assignee: Xerox Corporation, Stamford, Conn.

[21] Appl. No.: 260,664

[22] Filed: Jun. 16, 1994

Related U.S. Application Data

[63] Continuation of Ser. No. 53,286, Apr. 28, 1993.

[51] Int. Cl.⁶ .............................................. H04N 1/04
[52] U.S. Cl. .................... 358/474; 358/486; 358/483; 250/208.1
[58] Field of Search ................................. 358/464, 409

[56] References Cited

U.S. PATENT DOCUMENTS

| | | | |
|---|---|---|---|
| 4,314,281 | 2/1982 | Wiggins et al. | 358/280 |
| 4,396,903 | 8/1983 | Habicht et al. | 382/9 |
| 4,439,788 | 3/1984 | Frame | 358/483 |
| 4,485,405 | 11/1984 | Bailey | 358/213 |
| 4,540,901 | 9/1985 | Suzuki | 358/483 |
| 4,647,975 | 3/1987 | Alston et al. | 358/213 |
| 4,654,713 | 3/1987 | Boucharlat et al. | 358/483 |
| 4,665,440 | 5/1987 | Tromborg | 358/213.29 |
| 4,670,787 | 6/1987 | Levine | 358/161 |
| 4,691,237 | 9/1987 | Shimizu | 358/409 |
| 4,772,958 | 9/1988 | Suzuki | 358/464 |
| 4,878,119 | 10/1989 | Beikirch et al. | 358/471 |
| 4,992,653 | 2/1991 | Kawahara et al. | 250/208.1 |
| 5,034,825 | 7/1991 | Ejiri et al. | 358/475 |
| 5,101,108 | 3/1992 | Gaalema et al. | 250/332 |
| 5,221,848 | 6/1993 | Milch | 250/208.1 |
| 5,241,404 | 8/1993 | Furukawa et al. | 358/466 |
| 5,252,818 | 10/1993 | Gerlach et al. | 250/208.1 |

*Primary Examiner*—Edward L. Coles, Sr.
*Assistant Examiner*—Madeleine Nguyen
*Attorney, Agent, or Firm*—R. Hutter

[57] ABSTRACT

In a raster input scanner, an original image is converted into digital image data. A scanning bar having at least one array of photosites is moved relative to the original image, whereby the photosites are sequentially exposed to light within a range of intensities reflected from locations on the original image. Each of the image signals from the photosites is integrated as the scanning bar moves relative to the original image, some signals being integrated for a first duration to yield a long-integration image datum, and some signals being integrated for a second duration shorter than the first duration to yield a short-integration image datum. One of the long-integration image datum and the short-integration datum is selected for each location in the original image, depending on the intensity of light associated with the location in the original image.

5 Claims, 8 Drawing Sheets

FIG. 10 *PRIOR ART*

RASTER INPUT SCANNER WITH SHORT AND LONG INTEGRATION PERIODS

This is a continuation of application Ser. No. 08/053,286 Apr. 28, 1993.

The present invention relates to scanners in which a hard-copy original document is recorded on a photosensitive array moving relative to the document, and wherein the recorded image is then converted into digital data. More particularly, the present invention relates to a scanning system in which the dynamic range of the array is extended by integrating the output of the array for both long and short periods.

In the context of document processing, a raster input scanner (RIS), or "scanner," is a device by which an image on a hard-copy original, such as a sheet of paper, is converted into digital data. A common design for a scanner includes a linear array of photosensitive elements, which form sensors generally known as photosites. Each photosite in the array is adapted to output a signal, typically in the form of an electrical charge, of a magnitude proportional or otherwise related to the intensity of light incident on the photosite. By providing a linear array of these photosites and causing the array to scan across the hard-copy original, each photosite in the array will output a sequence of charge signals resulting from the various gradations of dark and light in the image as the individual photosites move through a path relative to the image. The exact nature of the charge signal from an individual photosite over time will, of course, be dependent on many factors such as the size of the individual photosite and the speed at which the scanning is performed.

In order to convert the charge signals output by individual photosites into usable digital image data, an important step is to control the "integration" over time of the signal being output by an individual photosite during the scanning process In one sense, integration is the sampling of the charge signal from a photosite for a certain period of time associated with one picture element (pixel). That is, during the scanning operation, the varying output of a photosite will be accumulated over a sequence of periodic scanning intervals, and the accumulated "batch" of charge for each interval will then be converted into a uniform gray scale value for a particular location in the image. The actual length of the integration time for a given pixel will depend on both the speed of the linear array relative to the image during the scanning process, and also the desired resolution of the system.

One well-known problem with photosensitive elements of the type typically used in scanners in the document-processing art is limitations in "dynamic range" of the photosensitivity of the elements, particularly in the way the signal output of the CCD is processed by the entire system. Briefly, if an original image, such as a photograph, includes various areas of "bright" and "dark" (that is, areas of high reflectance and low reflectance, respectively), the limited range of sensitivity of the photosites themselves will limit the ability of the photosites to accurately record the entire range from bright to dark. Further, the image-processing systems commonly used with a CCD, which are usually 8-bit systems, severely limit the resolution of shading that may be processed by the system; to extend the capacity of the system to 10 or 12 bits would significantly increase the cost of the entire system. The typical result of this limited range is that, in a copy of the original image made by the system, areas in a dark range of the original image will come out as a uniform black, and/or lighter areas on the original will come out as a uniform white. Either way, but particularly in regard to the dark areas, the image quality will be unsatisfactory when scanning in sophisticated images such as photographs.

More specifically, with a typical photosensitive device used in office equipment, such as a charge coupled device (CCD), the dynamic range is on the order of 1000:1. That is, the photosites are capable of discerning light from a certain intensity level to 1000 times that intensity level. Because most image-processing systems using CCD's are of the 8-bit variety, the effective dynamic range of a typical scanning system is more on the order of 300:1 or less. By comparison, an outdoor scene may contain as many as eight orders of magnitude of dynamic range, or 10,000,000:1. When viewing brightly-lit outdoor scenes, the human eye is able to detect details in both bright and dim regions of the scene by means of a phenomenon called "lateral inhibition." The detector cells of the retina adapt their sensitivity to the light level in the immediate area of light which is being focused upon them. For each detector cell in the retina, the "window of sensitivity" is individually adjusted to the optimal brightness range. As a result, a very wide overall dynamic range in the brightness variations over an entire image is compressed into a much narrower range of response, yet without losing any of the local detail that may contain visual information.

U.S. Pat. No. 4,314,281 discloses a raster scanner including a pair of multi-element scanning arrays which move relative to the original image. A test signal is produced for each sensor in the array by scanning a test image of a predetermined optical density. The results of this test signal are then averaged among subsets of sensors, and then the signal output of the sensors for each group is corrected.

U.S. Pat. No. 4,485,405 discloses an optical device which exploits the principle of "frustrated total internal reflection" to control photon access to a given sensor, to avoid smear noise from the sensor.

U.S. Pat. No. 4,647,975 discloses an electronic imaging camera on which a desired image is focused upon a two-dimensional array of photosites. Two exposures are made on the array, one with a short exposure time and one with a long exposure time for each picture, and then individual pixels from each exposure are compared and the desirable one chosen for the final image data.

U.S. Pat. No. 4,670,787 discloses a control system for a television camera including apparatus for controlling the magnitude of the developed video signal to reduce brightness variations caused by artificial scene illumination.

U.S. Pat. No. 4,878,119 discloses, in a raster input scanner, means for allowing the input scanner to operate asynchronously in which timing of the fixed rate shift pulses which delineate the integration period of the array is changed to maintain the shift pulses in timed synchronization with a random integration signal.

U.S. Pat. No. 5,101,108 discloses an infra red sensing array having first and second subarrays having different sensitivities for detecting different brightness level ranges. The first subarray includes a single column of detector elements, and the second subarray has a plurality of columns of detector elements parallel to the single column subarray. The output of the first subarray is appropriately multiplied to compensate for the difference in sensitivities to provide a similarly scaled output to the second subarray.

The article "Adaptive Sensitivity Cameras and Sensors" in *Advanced Imaging*, March 1990, at 50–52, discloses a technique for extending the dynamic range of a CCD camera by automatically adjusting the required sensitivity or exposure independently for every pixel or region in a scene being exposed.

Figure 3A:
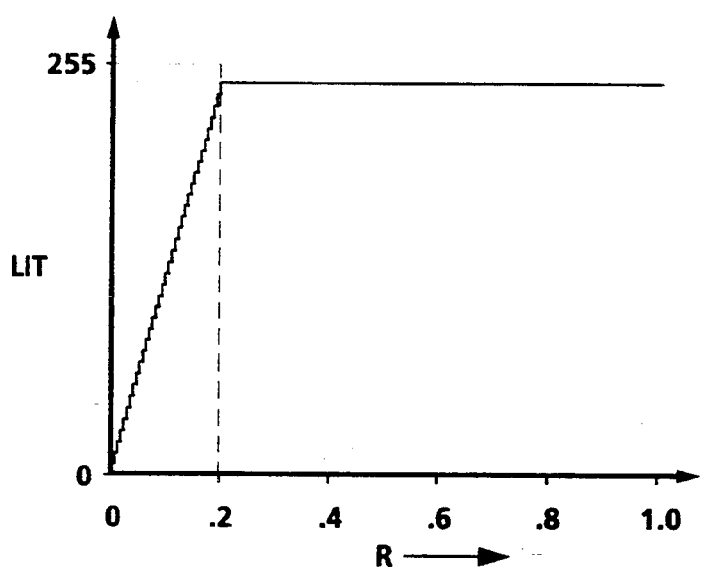
Figure 3B:
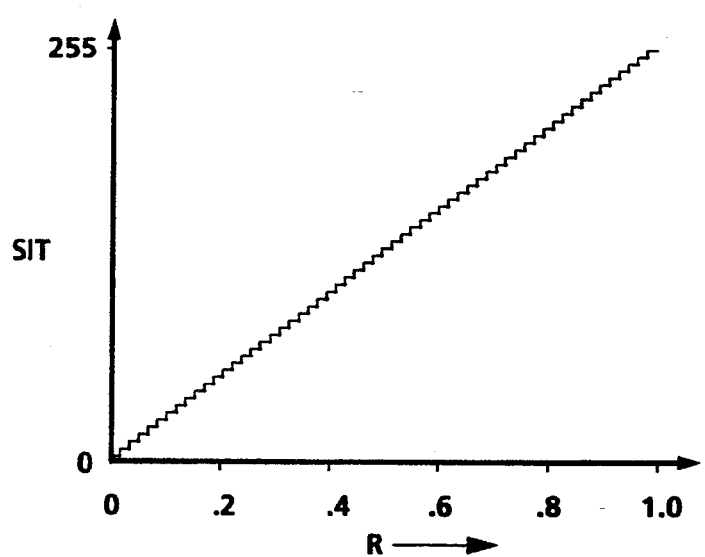
Figure 3C:
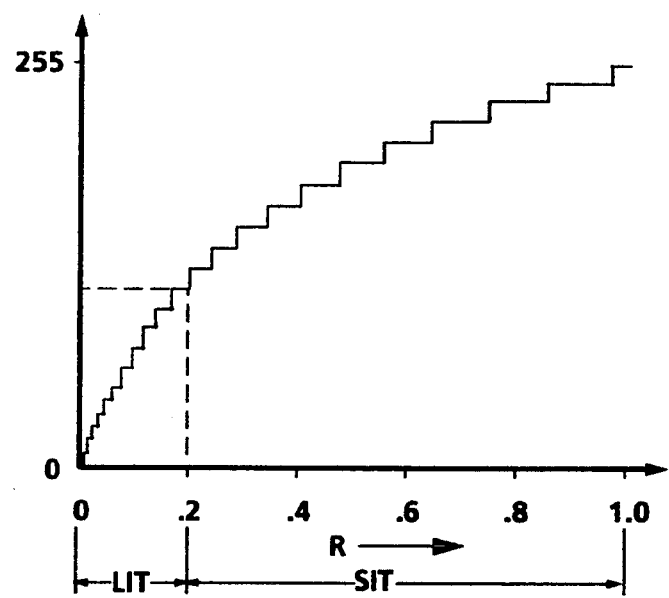
Figure 4:
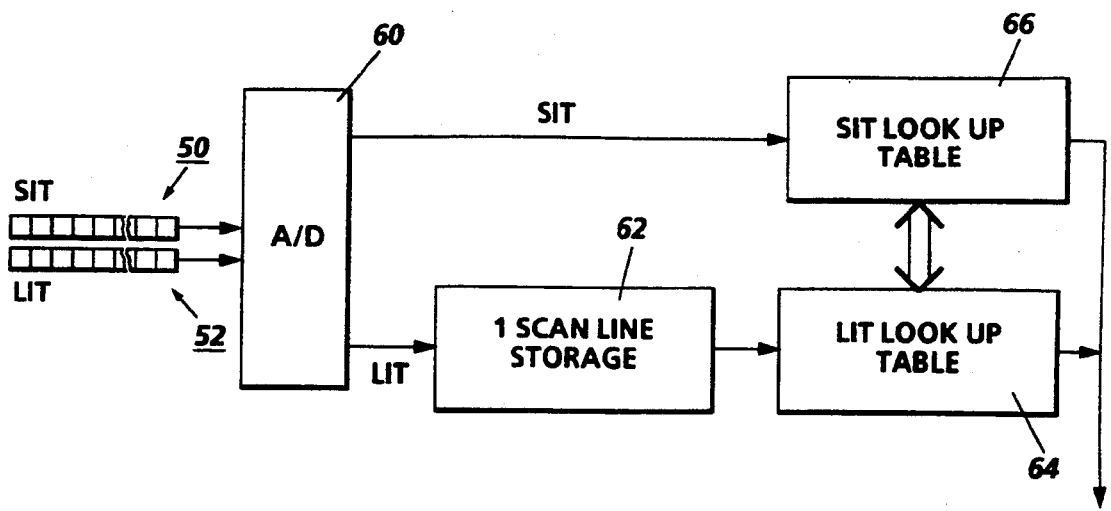
Figure 5:
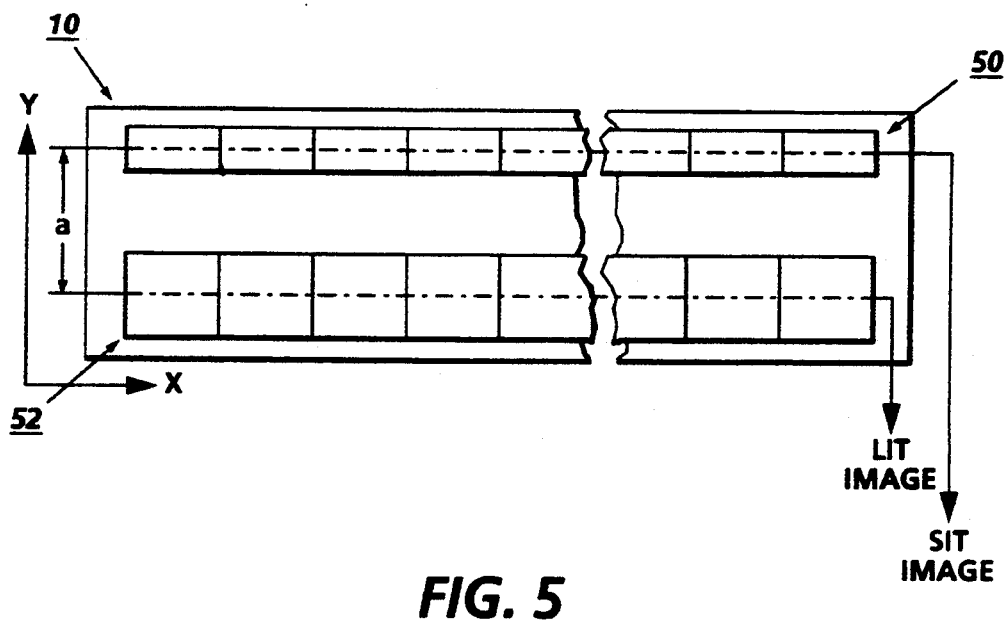
Figure 6:
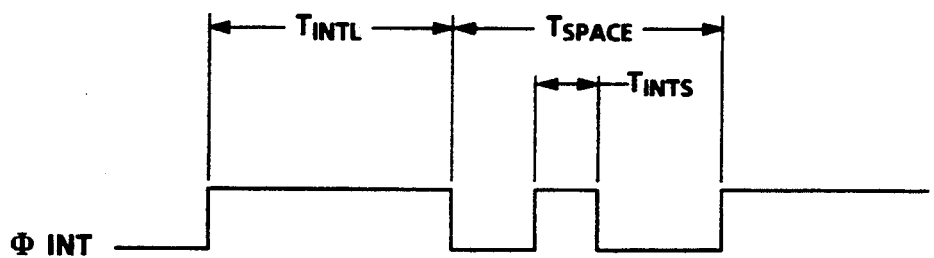
Figure 7:
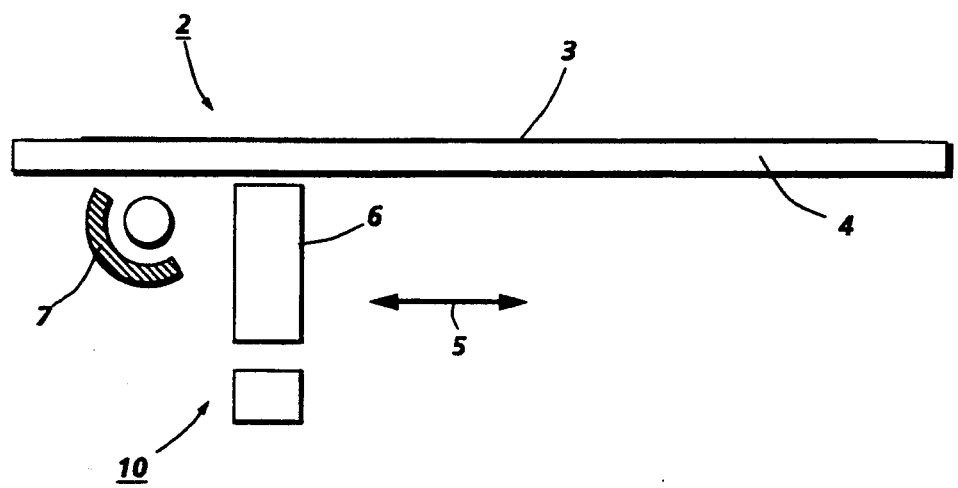
Figure 8:
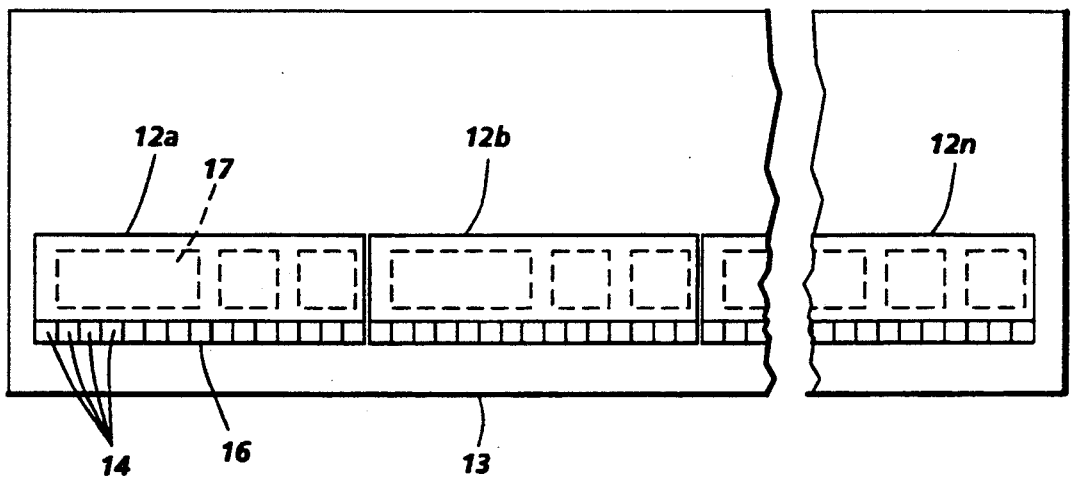
Figure 9:
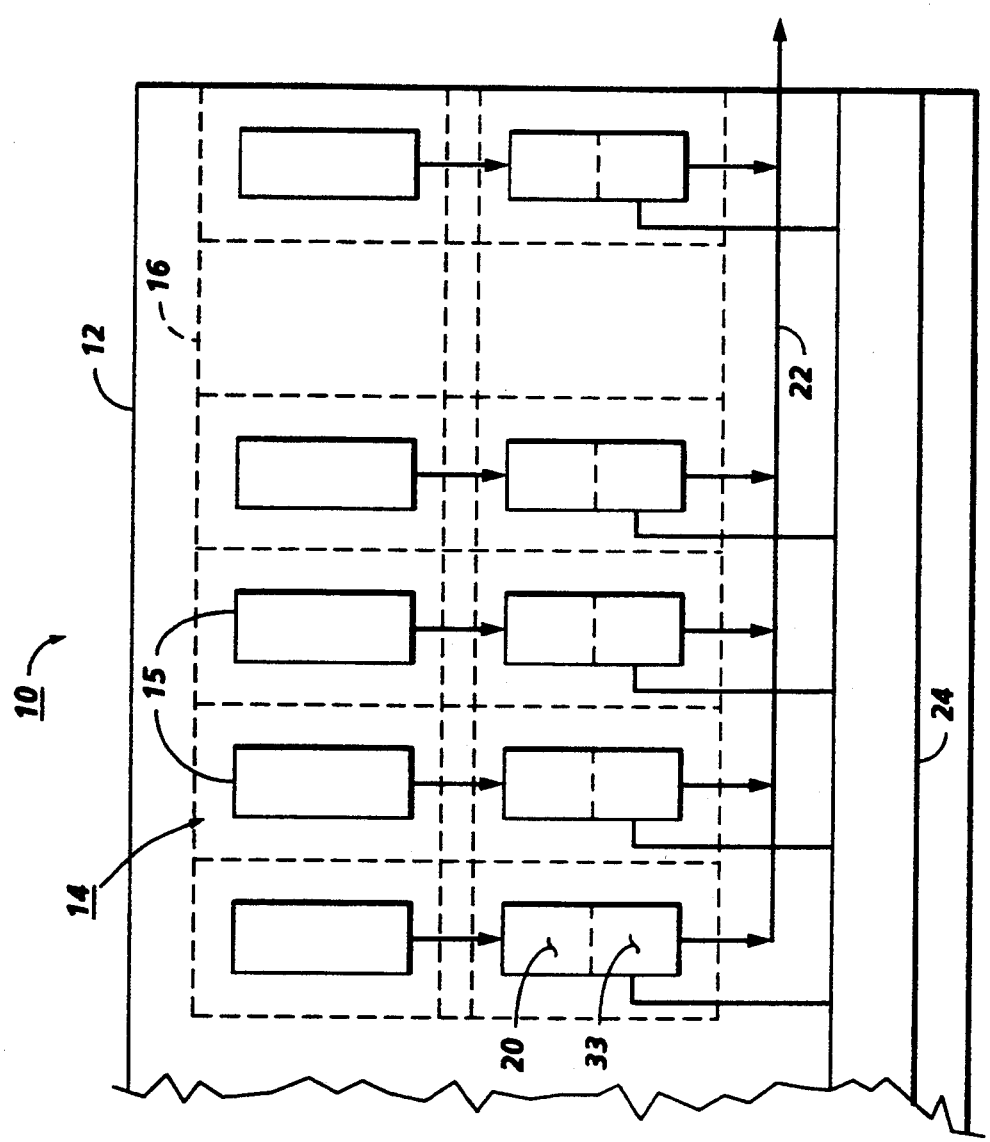
Figure 10:
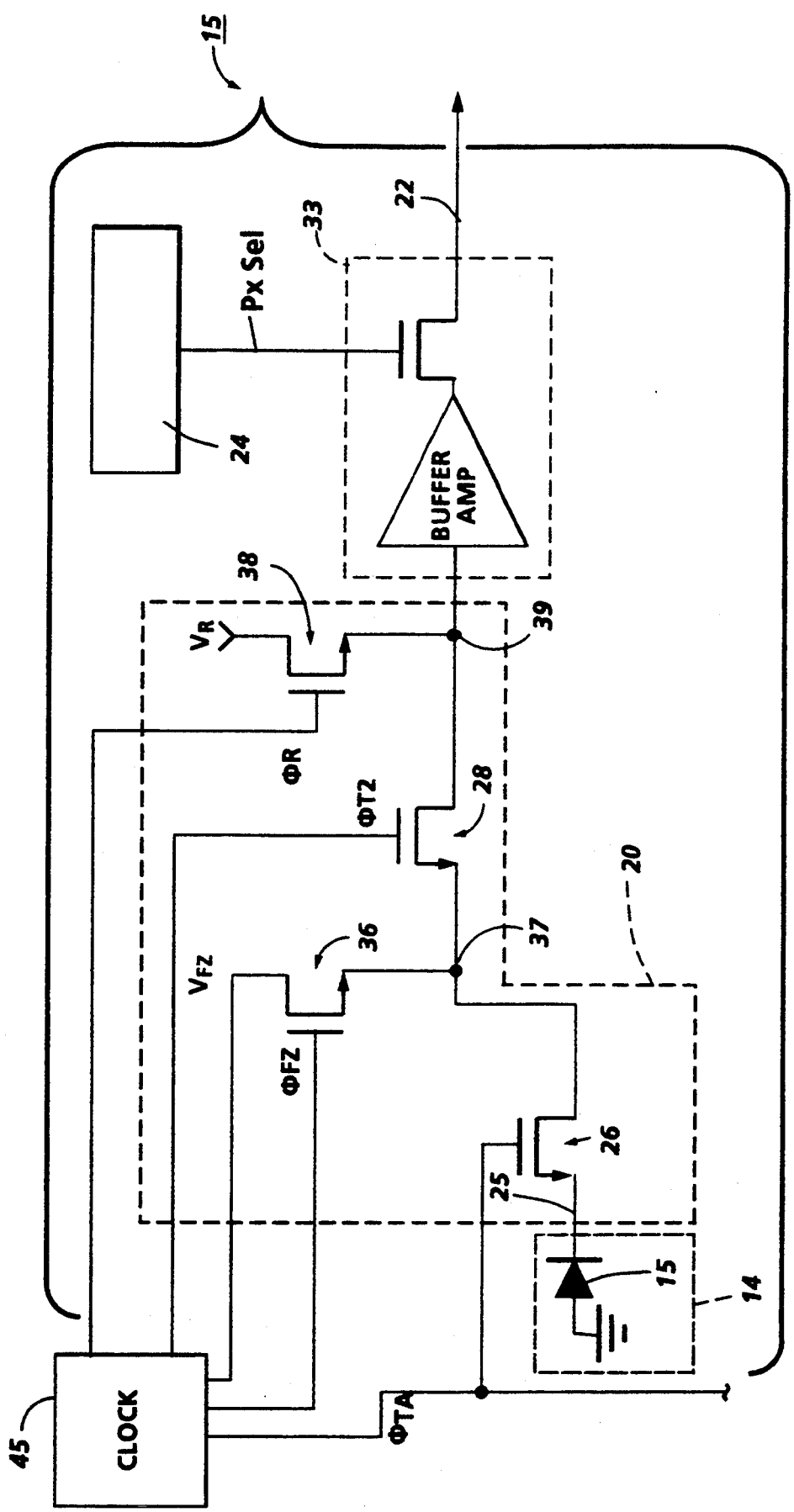
Figure 11:
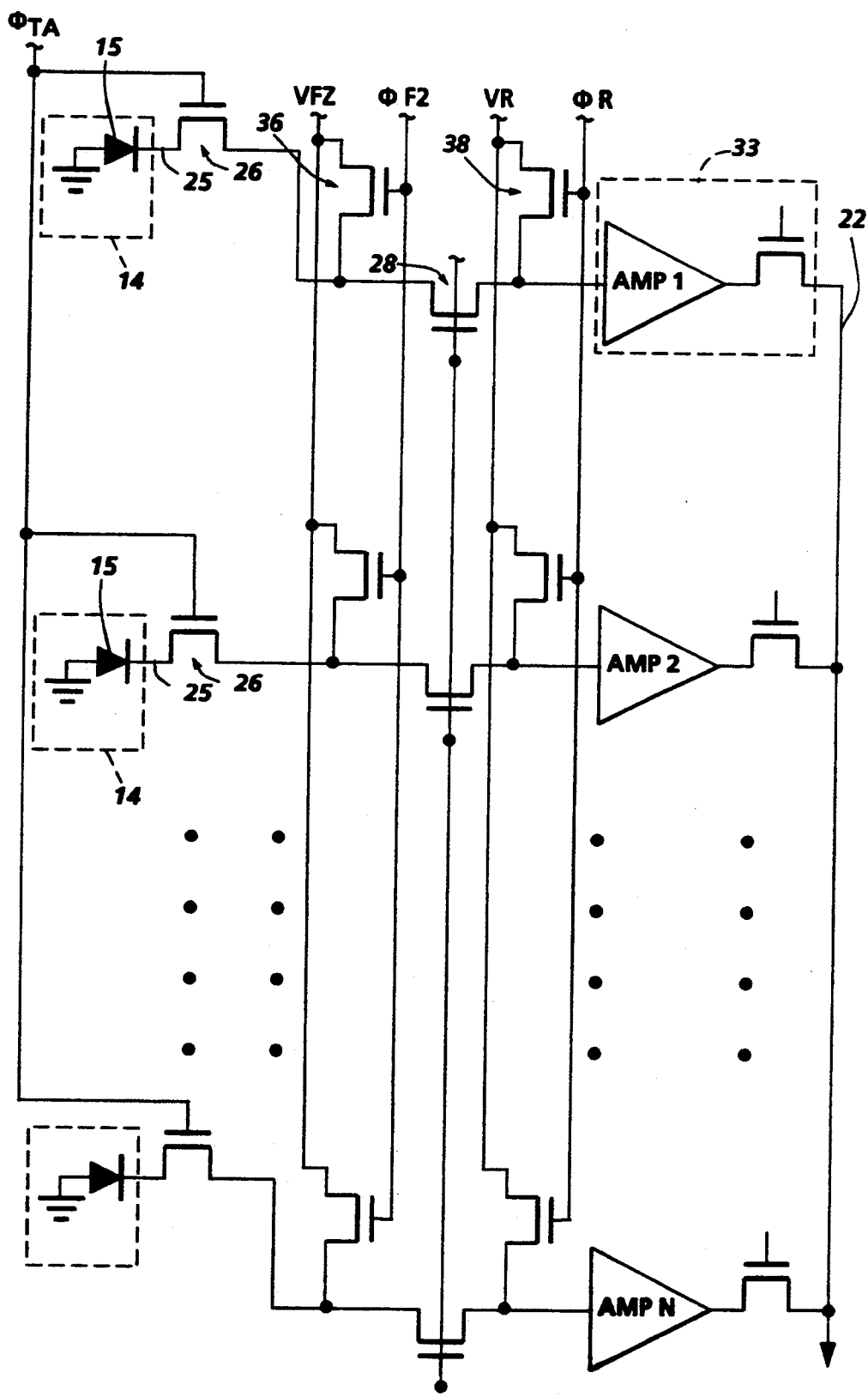

FIGS. 3A, 3B, and 3C are a series of graphs showing the response of the system of the present invention as a function of the reflectivity of a portion of an image:

FIG. 4 is a block diagram showing the merging of two types of images according to the operation of one embodiment of the present invention;

FIG. 5 is a simplified plan view of a double row of photosites as used in another embodiment of the present invention;

FIG. 6 is a simplified timing diagram illustrating the operation of one embodiment of the present invention;

FIG. 7 is a schematic view of a raster input scanner having a full width array;

FIG. 8 is a plan view illustrating a full width color array of the type fabricated by abutting a plurality of chips of the present invention together;

FIG. 9 is a schematic view of an image scanning array having an array of photosite cell, each cell having a photodiode area with a two stage transfer circuit and an amplifier for transferring image signal charges from the photodiode areas to a common output bus;

FIG. 10 is a circuit schematic showing a pixel cell;

FIG. 11 is a schematic view depicting an array of pixel cells; and

Figure 12:
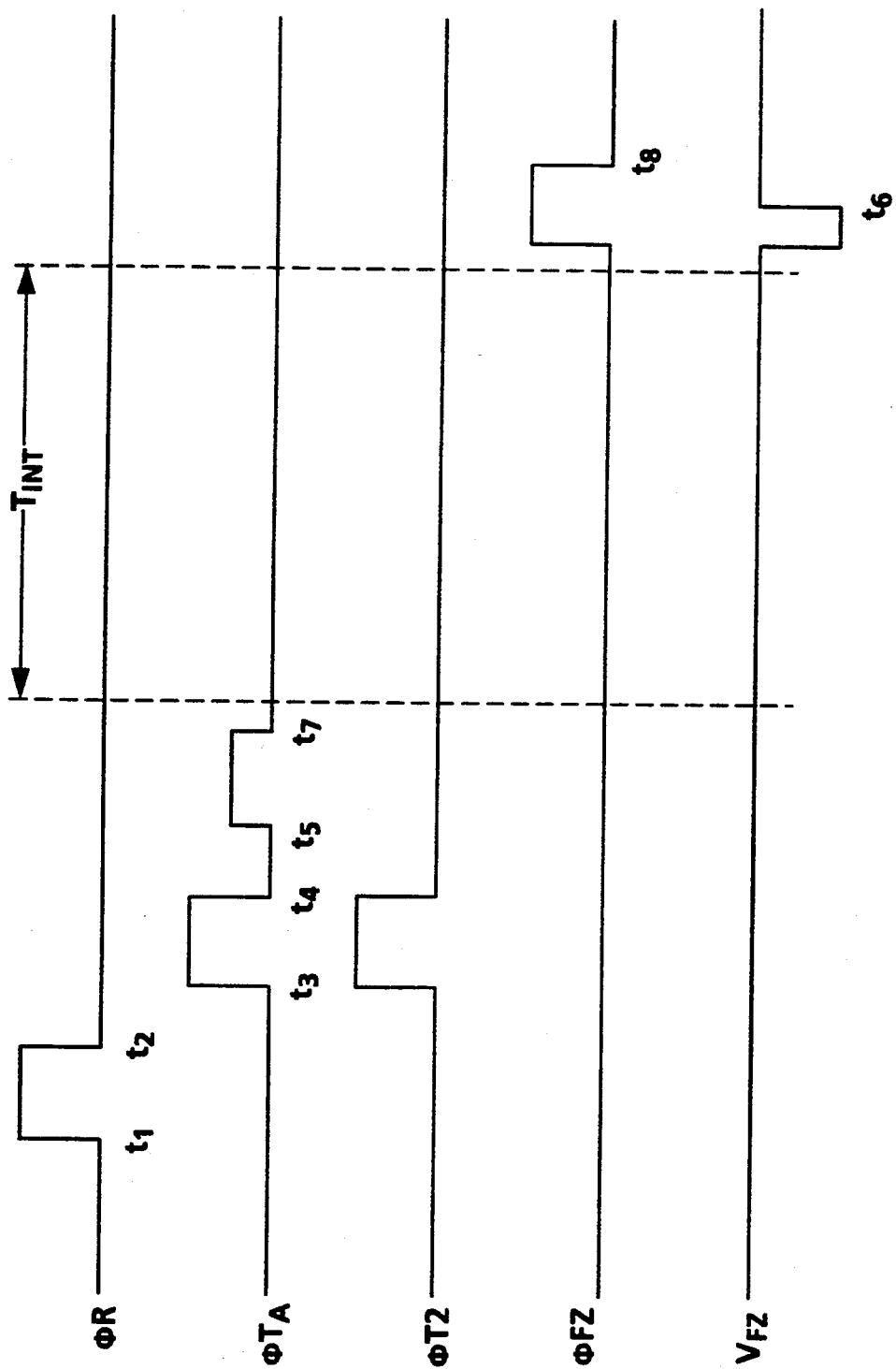

FIG. 12 is a timing diagram showing the operation of one aspect of the present invention a synchronous manner.

According to one aspect of the present invention, there is provided, in a scanner comprising a scanning bar including a first linear array of photosites and a second linear array of photosites disposed in fixed relation parallel to the first linear array of photosites, each photosite adapted to output an image signal related to the intensity of light incident thereon, a system for recording an original image as digital image data. The scanning bar is moved relative to the original image, whereby the photosites are sequentially exposed to light within a range of intensities reflected from locations on the original image as the scanning bar moves relative to the original image. Each of the image signals from the photosites is integrated as the scanning bar moves relative to the original image, each signal from the first linear array being integrated for a first duration to yield a long-integration image datum, and each signal from the second linear array is integrated for a second duration shorter than the first duration to yield a short-integration image datum. One of the long-integration image datum and the short-integration datum is selected for each location in the original image, depending on the intensity of light associated with the location in the original image. A sequence of the selected image data is then output.

According to another aspect of the present invention, there is provided, in a scanner comprising a scanning bar including a single linear array of photosites, each photosite adapted to output an image signal related to the intensity of light incident thereon, a system for recording an original image as digital image data. The scanning bar is moved relative to the original image, whereby the photosites are continuously exposed to light within a range of intensities reflected from locations on the original image as the scanning bar moves relative to the original image. The output of the photosites are integrated over a first periodic duration to yield a long-integration image datum, and the output of the photosites are also integrated over a second periodic duration shorter than the first periodic duration to yield a short-integration datum. One of the long-integration image datum and the short-integration datum for each location on the image is selected, depending on the intensity of light on the photosite for the location on the image. A sequence of the selected image data is then output.

Referring to FIG. 7, there is shown an exemplary raster input scanner, designated generally by the numeral 2, of the type adapted to incorporate the present invention. Scanning bar 10 comprises one or more linear full width arrays, also known as "contact" arrays, having a scan width substantially equal to or slightly greater than the width of the largest document 3 to be scanned. Documents to be scanned are supported on a generally rectangular transparent platen 4, typically glass, sized to accommodate the largest original document 3 to be scanned. A document 3 to be scanned is located either manually or by a suitable automatic document handler or feeder (not shown) on platen 4 for scanning. The image module, which comprises at least scanning bar 10 but may also include a lens 6 and reflector assembly 7, is supported for reciprocating scanning movement in the slow scan direction (i.e. y direction) depicted by arrows 5 below platen 4 by a movable scanning carriage (not shown). The means for moving the scanning bar 10 relative to the hard-copy original will be readily apparent to one skilled in the art, and may include any arrangement of continuous or stepper motors, rotatable screws, pulleys, gears, etc. as needed for a desired system design. The lens 6 focuses array 10 on a line like area, in the fast scan direction (i.e. x direction), extending across the width of platen 4. One or more lamp and reflector assemblies 7 are provided for illuminating the line-like area which scanning bar 10 is to record. It will be appreciated by one skilled in the art of raster input scanners that scanning bar 10 may be moved relative to the original image either by moving the bar relative to a stationary original, or moving the original (such as on a moving platen) relative to the stationary bar 10, or a combination of such types of motion.

Referring to FIG. 8, there is shown a portion of a long or full width scanning bar 10 composed of a plurality of smaller sensor chips 12 assembled together end-to-end (specific chips are identified by numerals 12a, 12b, ... 12n) on an elongated generally rectangular rigid substrate 13. In one embodiment, an electrically conductive metallic covering or coating such as copper may be provided on the surface of substrate 13 to which the chips 12 are attached to provide the required ground connection and EMI immunity.

Chips 12, which may, for example, be Charge Coupled Devices (CCDs) or MOS sensor arrays, are relatively thin silicon dies having a generally rectangular shape. A row 16 of photosites 14 parallel the longitudinal axis of the chips. While a single row 16 of photosites 14 is shown, plural photosite area rows may be contemplated. Other active elements such as shift registers, gates, pixel clock, etc., (designated generally by the numeral 17 herein, although individual shift registers may be provided adjacent each photosite in the chip) are preferably formed integrally with chips 12. Suitable external connectors (not shown) are provided for electrically coupling the chips 12 to related external circuitry.

Referring to FIG. 9, there is shown an example scanning bar 10 having, for purposes of illustration, one image sensor array with two stage transfer. Scanning bar 10 includes thereon a number of chips such as 12 of silicon, each with a plurality of photosites 14 thereon. Photosites 14 are in closely spaced juxtaposition with one another on chip 12 in a linear array or row 16. Each photosite 14 has a two stage transfer circuit 20 associated therewith and an amplifier 33. In each photosite 14, the image signal charge from a photodiode 15 is transferred by circuit 20 to amplifier 33 where the image signal charge from photodiode 15 in photosite 14 is amplified to bring the image signal charge to a desired potential level prior to transferring the corresponding voltage signal to a common video output line or bus 22. Suitable shift register and logic circuitry 24 provide timing control signals for connecting each photodiode 15 to bus 22 in the proper timed sequence.

The array of photosites 14 on the bar 10 may for example be used to raster scan a document original as in FIG. 7, and in that application, the document original and the scanning bar 10 are moved or stepped relative to one another in the slow scan direction that is normally perpendicular to the linear axis of bar 10. At the same time, the array scans the document original line by line in the fast scan direction parallel to the linear axis of the array. The image line being scanned is illuminated and light from the document is focused onto the photodiodes 15 in photosites 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

In the ensuing description, all transistors shown are N-channel type. However, P-channel transistors may instead be used with appropriate voltage level changes as will be understood.

Referring particularly to FIGS. 8, 10–11 where like numerals designate like elements, the two stage transfer circuit 20 associated with each photosite 14 has first-stage transfer transistor 26 and second-stage transfer transistor 28 for transferring the image signal charge from the photodiode 15 to amplifier 33. Transistors 26 are in series with line 25 connecting one electrode of photodiode 15 with the input gate of amplifier 33. The other electrode of photodiode 15 is grounded. A bias charge injection transistor 36 is provided to inject a bias charge, for example, an electrical fat zero VFZ, to line 25 at middle node 37. A reset transistor 38 controls the reset voltage VR at the node 39 between transistor 28 and amplifier 33.

A suitable clock 45 provides a suitable source pulses $\Phi R$, $\Phi t$, $\Phi t2$, $\Phi FZ$, and $V_{FZ}$. Pulses $\Phi t$, $\Phi FZ$, and $V_{FZ}$ provide for injection of the bias charge into lines 25 and pulses $\Phi t2$ and $\Phi R$ for setting node 39 to voltage VR. As will appear, pulses $\Phi t$ of different amplitude are provided for transferring the image signal charges from photodiodes 15 to amplifiers 33. The PxSel signals used for multiplexing the amplified charge output by amplifier 33 onto the common video output bus 22 are provided by shift register and logic circuitry 24.

In operation and referring particularly to FIGS. 10-12, during time interval $t_1$–$t_2$, pulse $\Phi R$ actuates reset transistor 38 to apply reset voltage VR to node 39 to reset the input to amplifier 33. Subsequently, at time interval $t_3$–$t_4$, pulse $\Phi tA$ and $\Phi t2$, actuate transistors 26 and 28 respectively of two stage transfer circuit 20 to transfer the image signal charge accumulated on the photodiode 15 of each photosite 14 to amplifiers 33. To facilitate transfer of the image signal charges, the amplitude $V(\Phi TA)$ of waveform $\Phi TA$ is smaller than the amplitude $V(\Phi T2)$ of pulse $\Phi t2$. During injection of the bias charge, at time $t_5$, the $\Phi TA$ and $\Phi FZ$ pulses go high while pulse $V_{FZ}$ goes low. Following preset intervals at times $t_6$, $t_7$, and $t_8$, the pulses $V_{FZ}$, $\Phi TA$,, and $\Phi FZ$ return to their nominal level. As will be explained in detail below, the time period between the application of $\Phi TA$ and $\Phi FZ$ represents the integration time, shown as $T_{INT}$, for the pixels in that row of photosites for that cycle of exposure.

Having explained the general operation of a preferred embodiment of a two-stage transfer system for a scanning array which may be used in conjunction with the present invention, there will now be described the general principle of the present invention.

Figure 1:
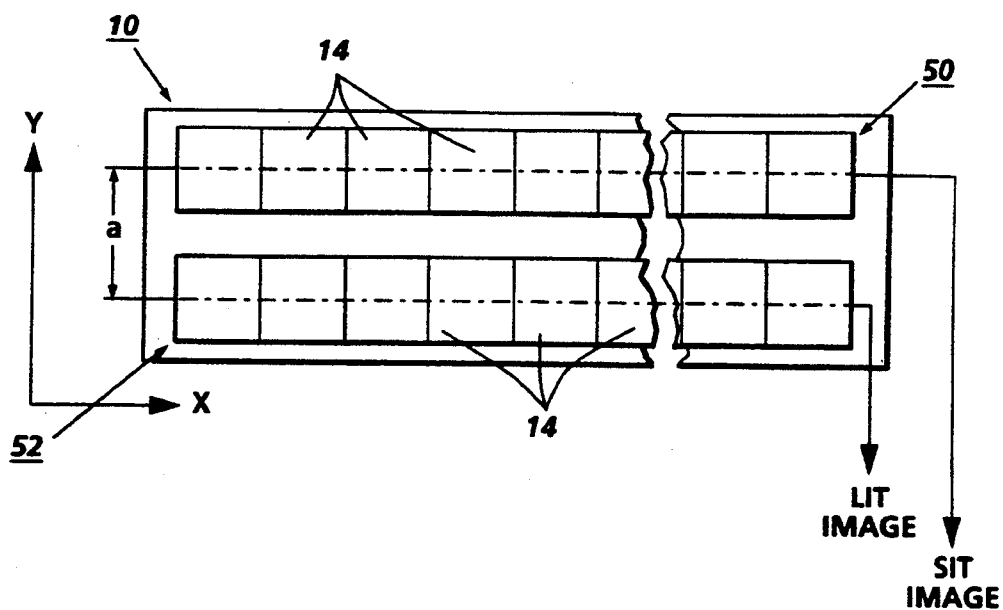
FIG. 1 is a simplified plan view of a double row of photosites as used in one embodiment of the present invention.

FIG. 1 is a simplified view showing a portion of the photosites 14 in a scanning array according to one embodiment of the present invention. According to this embodiment of this invention, there are provided on a scanning bar 10 two parallel rows of photosites 14 adapted to move relative to a hard-copy original image. Although each photosite 14 operates as each photosite in the system described above, the photosites are arranged in two separate rows which are spaced in fixed relation, preferably by one or more integral pixel widths apart, as shown in the drawing as spacing a. The two rows 50 and 52 are together mounted within the scanner so that the two rows are exposed to the hard copy original substantially simultaneously, although image data entering one row of photosites 50 will be one or more integral pixel widths "ahead" of the information coming into row 52.

According to the present invention, the operation of rows 50 and 52 of photosites 14 differ only in that the photosites in row 50 are adapted to receive light reflected from the original with a relatively short integration time, while the photosites in row 52 are adapted to receive light from the original and convert it into a signal with a long integration time. In the context of the present invention, "integration time" is defined as the time in the operation of the scanner in which light on a particular photosite is converted into usable signal. That is, when light impinges on a photodiode on the photosite 14, charge will be created in the photodiode. The "integration time" of the photosite is the time sample from which a quantity of charge is collected during the scanning process to be converted into a signal. Thus, the longer the integration time, the more light will have been collected. Integration time is in effect the same as the exposure time of photographic film, although it should be emphasized that in the present case, light may be continuously impinging on the photodiodes in photosites 14 and that there is no shutter mechanism. According to the preferred embodiment of the present invention, the "exposure" is a matter of deciding the duration of time for each pixel from which charge will be sampled. A longer integration time will mean the collection of more charge, for a longer "exposure."

As with photographic film, the advantage of a long integration/exposure time is that the darker areas of an image may be more accurately rendered, with a higher resolution of gray-scale values toward the dark end of the gray scale. However, with a long integration time, lighter areas of the image will flood the photodiodes with too much light, and the photodiodes will not be able to discern gradations of lightness brighter than a certain point. As mentioned above, in order to effect this compromise between long and short exposure times, digital image processing equipment may be adapted to compare short and long exposure images and select the "better" exposures on a pixel-by-pixel basis. Thus, by combining short and long integration times, the areas exposed with long integration times may be chosen to accurately render darker areas of a monochrome image, while the short integration time images may be selected for the lighter portions of the image. By combining the preferred exposures for the lighter portions of a single image, images may be recorded with a broad dynamic range, such as in the human eye.

Referring back to FIG. 12, it will be seen that the effective integration time period, shown as $T_{INT}$, for each row of photosites in the preferred embodiment of the present invention extends from the end of the transfer cycle at t8 up to the application of the transfer voltage $T_{A1}$ at t3 at the beginning of the transfer process for that scan line. Thus, while the period from t3 to t8 in the transfer process represents an effective "dead time" in which the light on a particular photodiode is not going anywhere, the rest of the cycle, from t8 of one pixel to t3 of the next pixel, represents the integration time $T_{INT}$ for that particular scan line. Thus, by programming the control system for the device so that the period between t3 and t8 is extended, the effective integration time, t8 of one scan line to t3 of the next scan line, is artificially shortened. In this way, a "short integration time" process may be carried out for the photosites 14 in row 52. Meanwhile, the photosites in row 50 can be operated by the typical method in which the dead time between t3 and t8 is minimized.

Figure 2:
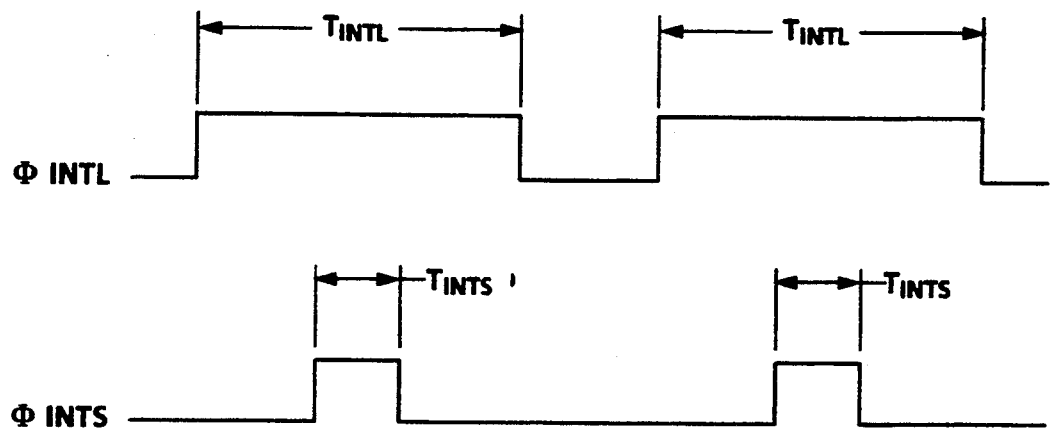
FIG. 2 is a pair of comparative timing diagrams illustrating the operation of one embodiment of the present invention.

FIG. 2 shows how the relative durations of the short and long integration times from the photosites 14 in rows 50 and 52 compare over time. As can be seen, the long integration times $T_{INTL}$ are represented by bit-high portions of the graph, maximizing the integration time with the photosites relative to the total time of operation. Simultaneously, in row 50 of photosites 14, the integration time is shorter for each pixel, and the shorter integration times $T_{INTS}$ are spaced out to correspond and be simultaneous with the long integration times, as shown as $T_{INTS}$ in FIG. 2. (The start and stop pulses shown in the Figure are generalized for any kind of system design for controlling the integration times of a set of photosites.) Thus, it can be said that the short integration times of the photosites in row 50 are "nested" within the longer integration times of the photosites in row 52; in order to ensure a consistency of locations being observed by the two rows of photosites, it is preferable that the short integration period be located in time around the midpoint of the long integration period. The speed of operation of the scanning system in general is limited only by the duration of the long integration time, because the short integration periods occur simultaneously, within the long integration periods. Of course it will be noted that, if the two rows of photosites are spaced apart relative to the original image, two photosites will be "looking at" slightly different images; if the rows 50 and 52 of photosites are spaced by one pixel length apart, one row of photosites will be one line of pixels "behind" the other. However, this discrepancy can be obviated by the placement of a buffer in the forward-edged row of photosites, in a manner which would be apparent to one skilled in the art.

Turning now to FIG. 3A, 3B, and 3C, there is shown simplified graphs of the surface reflectivity (lightness or darkness) of a given location in a original image and, as a function thereof, the digital output of a long-integration channel (that is, the output from a long-integration photosite), a short-integration channel (that is, the output from a short-integration photosite), and, at the bottom, a combined system of short and long integration times according to the present invention. In a system wherein the long-integration time signals are selected for the darker (i.e., less reflective) portions of an original, the long integration time signal (LIT) will be useful only for those darker portions of the image. As can be seen in FIGS. 3A, in this example, areas of the original having a reflectivity of less than 0.2 are precisely detected with the long integration time. It will be noted that, because the LIT signal "peaks" or "saturates" at 0.2 reflectivity, any value higher than arbitrary value near the top of the range (as shown in the graph, about 240 on a scale from 0 to 255) will flood the long-integration photodiode and render a useless number. The discrete levels of resolution are shown in the graph (which is exaggerated in its coarseness) as steps in the graph corresponding to a continuum of gray scale levels possible in an image.

Looking at FIG. 3B, there is shown a typical digital response for a channel having a relatively short integration time (SIT). For the short integration time the levels from 0 to 255 conceivably extend the entire range from the reflectivity of 0 (total black) to 1.0 (total white). Because the range of reflectivity is much greater (along the x-axis) for the SIT channel, each output value on the 0-to-255 scale will have a greater possible range of actual reflectivity associated with it. Therefore, the output of the SIT channels will be less precise than that of the long-integration-time channels.

However, in this example, according to the present invention, the system has been designed so that all areas of a reflectivity of less than 0.2 are recorded with the signal from the long-integration time channel for that pixel. Thus, as can be seen in the top graph, the LIT gray scale resolution of the 0 to 0.2 reflectivity is considerably higher (finer) than in the rest of the graph. However, because the SIT channel signals will be used when the reflectivity of a given location is 0.2 and higher, the entire range is thus covered. The increased gray scale resolution toward the dark end of the gray scale can thus be exploited to render more realistic a recording of, for example, the dark areas of a photograph being converted to digital data.

Once a combined range of outputs, incorporating a range of outputs from the LIT channels for low reflectivities and outputs from the SIT channels for higher reflectivities, is available, the issue comes up of accommodating signals from this combined, extended range into an image-processing system. One design option would be to accomodate the entire extended range, 240 steps of the LIT output range plus a comparable number of extra steps from the relevant portion of the SIT output range, into the system; however, while such a system would be very good at precise recording of the darker parts of an image, the extra range of signals would mandate expanding the entire system from the typical 8-bit to 10 bits or more, which could be impractical or expensive in many cases. A preferred technique is to normalize this extended combined range onto a new 0-to-255 scale, which of course will "fit" into a pre-existing standard 8-bit system. Such a normalized system output, derived from a combination of the SIT and LIT outputs, is expressed by graph of FIG. 3C. The function shown in that particular graph, it will be noticed, is a stepwise fucntion, but also demonstrates a distinct curve so that the step-resolution becomes more precise (i.e., the steps become smaller along the x-axis) toward the "dark" end of the range. This particular arrangement effectively increases the gray-scale resolution where such an increase has been found to be most needed in practical systems.

This normalization step can be carried out by means of a look-up conversion table embodied in the system software or hardware. The normalization function such as shown in FIG. 3C is essentially a "synthetic" one, artificially contrived for suitably improving the perceived performance of the system, but the input applied to the function is dependent on the detected input reflectivity for a given pixel, and thus dependent on the original output selected from either the LIT or the SIT channel. Thus, as shown in FIG. 3A, 3B, and 3C, a pixel having a reflectivity of less than 0.2 will be detected by the LIT photosite to yield an output value from the scale in the graph of FIG 3A. This LIT output value is then converted to a new value on the normalized scale, and then processed by the system; the steps of producing and selecting the LIT output value are necessary because the normalized scale in that part of the reflectivity range is still finer than could be detected by the SIT scale alone. For a reflectivity greater than 0.2, wherein the signal from the SIT is selected the normalization is still useful for generally improving the gray-scale performance of the system.

FIG. 4 is a simplified systems diagram showing a system for merging the long integration time and short integration time images generated with a two-row sensor array such as shown in FIG. 1. Whether the integration of a signal row from a photosite in 50 or 52 is for a long or short duration, the integrated signal is converted to a digital value, such as by A/D converter 60. (It will be apparent to one skilled in the art that separate A/D converters may be provided for each row of photosites, and also that the A/D converters may be provided at other locations in the system, depending on a specific system design.) After the parallel lines of data from the long and short integration time rows 50 and 52 respectively are converted into digital data, one of the sets of data for a given line is buffered, as by buffer 62, for the duration of scanning one line, so that the digital data for two sets of pixels for the same line may be compared. There is thus created two parallel streams of digital pixel data which may be directly compared, and the more suitable of the pair will be selected for each pixel. Using the example of FIG. 3, one simple way of selecting the suitable datum for the pair is to first look at the long integration time datum, and if it is of a value greater than 240 out of 255, or some comparable number toward the "lighter" maximum of the LIT scale, choose the short integration time value for that pixel. Thus, the long integration time value will be chosen unless the long integration time value is 240 or over; then the short integration time value must be chosen. This technique may be carried out, for example, by a pair of of interacting look-up tables, such as 64 and 66, which act as a "selector" for choosing the appropriate image datum. Further, the normalization of the slected outputvalue, as in the bottom graph of FIG. 3, may be incorporated in these look-up tables. If, in this embodiment, the brightness value in look-up table 64 for the long integration time is in excess of 240, the look-up table 64 can be activated to cause the value in the look-up table 66, relating to the short integration time, to be output instead. Variations of this general technique will be apparent to one skilled in the art.

FIG. 5 shows a possible variation of the present invention, where, instead of or in addition to providing a shorter integration time for one of the rows of photosites, the photosites for the short integration time are simply made physically smaller by a known proportion to the corresponding photosites for the long integration time. The short-integration photosites may conceivably be "shrunk" relative to the long-integration photosites in any dimension. The smaller surface area will, of course, cause less light to impinge on the individual photosites regardless of time. This principle is equivalent to increasing the "f-stop" in a film camera as opposed to decreasing the exposure time. This use of a smaller set of photosites can then be used to have the same effect as a shorter integration time.

FIG. 6 is a timing diagram, generalized from any type of system, for an embodiment of the present invention in which a single row of photosites is used in scanning bar 10, and wherein a single row of photosites is used, such as in existing types of scanning systems, but with each sampling of each pixel, two integration times are carried out in succession. As an individual photosite 14 in the single row passes a given location in the original image, first a long integration time exposure $T_{INTL}$ is made, and then immediately or shortly thereafter following, a short integration time "exposure" $T_{INTS}$ is made. The small but finite size of an individual photosite 14 can cause this double scanning to be carried out fairly effectively only at the expense of some decrease in the process speed. As seen in FIG. 6, the typical scanning period for a given location is simply divided into a main portion of the long integration time and then a shorter second portion for the short integration time. Thus, on a pixel to pixel basis as the scanning array scans the original image, there is a constant alternation between a long and short integration times. For purposes of convenient input of image data, it may be preferable to "nest" the short integration period $T_{INTS}$ within a spacing period $T_{SPACE}$ which is equal in duration to the $T_{INTL}$ long integration period, as shown. Sorting out of the long and short integration time data as the image data is converted into digital data may be carried out through image processing means which will be apparent to one skilled in the art, assuming that adjacent long and short integration time signals are addressed to roughly the same areas within the original image. The scanning of the photosite array in this embodiment need not be a continuous sweep, but could conceivably be in the manner of indexing, so that the scanning bar will dwell over a particular line of pixel areas in the original image long enough to carry out long and short integration time exposures on substantially the same set of pixel areas.

A possible variation to the structure of a scanner of the present invention would be to provide the two photosites per pixel in two rows on a single row of silicon chips, and thus have both the SIT and LIT photosites for each pixel share, as in the illustrated embodiment of FIG. 9, one transfer circuit 20 and amplifier 33. Further, a color version of a scanner according to the present invention may be contemplated, possibly with, for example, six photosites for each pixel, suitably filtered photosites being provided for each of three primary colors and for both SIT and LIT.

Yet another possible embodiment of the present invention would be simply to provide one row of photosites and scan each page of the original image twice in separate steps, the first step being of one integration time and the second step of a second integration time. At the end of two scans, there would thus be two batches of image data, the first of which being buffered to facilitate a pixel-by-pixel comparison of the two entire page images. The suitable datum for each pixel would be selected in a manner such as that described above in regard to the two photosite-row embodiment.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A scanner for recording an original image as digital image data, comprising:

a scanning bar including a first linear array of photosites and a second linear array of photosites disposed in fixed relation parallel to the first linear array of photosites, each photosite adapted to output an image signal related to the intensity of light incident thereon;

means for producing relative movement between the scanning bar and the original image, whereby the photosites are sequentially exposed to light within a range of intensities reflected from locations on the original image as the scanning bar and the original image move relative to one another;

an integrator for each of the image signals from the photosites as the scanning bar and the original image move relative to one another, including means for integrating each signal from the first linear array for a first duration to yield a long-integration image datum, and means for integrating each signal from the second linear array for a second duration shorter than the first duration to yield a short-integration image datum; and a selector for selecting one of the long-integration image datum and the short-integration datum for each location in the original image, depending on the intensity of light associated with the location in the original image, by selecting the short-integration datum for a location in the original image when the long-integration image datum is associated with a light intensity greater than a predetermined threshold level.

2. A method of recording an original image as digital image data in a scanner comprising a scanning bar including a linear array of photosites, each photosite adapted to output an image signal related to the intensity of light incident thereon, comprising the steps of:

producing relative movement between the scanning bar and the original image, to expose the photosites to light reflected from locations on the original image as the scanning bar and the original image move relative to one another;

for each location on the original image, integrating an output of a photosite over a first duration to yield a long-integration image datum, and integrating the output of the photosite over a second duration shorter than the first duration to yield a short-integration image datum;

buffering one of the long-integration image datum and the short-integration image datum for a predetermined period for each location on the original image as the scanning bar moves relative to the original image;

selecting one of the long-integration image datum and the short-integration datum for each location on the image, depending on an intensity of light on the photosite for the location on the image; and outputting a sequence of the selected image data.

3. A method as in claim 2, further comprising the step of normalizing the selected image datum to a value on a preselected range of output values.

4. A method as in claim 2, wherein the integrating step over the second duration occurs during a spacing period following the integrating step over the first duration, the spacing period being substantially equal in duration to the first duration.

5. A method as in claim 2, wherein the step of producing relative movement comprises producing relative movement of the scanning bar relative to the original image in a stepwise fashion.

* * * * *